United States Patent
Thouy et al.

(10) Patent No.: US 9,076,075 B2
(45) Date of Patent: Jul. 7, 2015

(54) METHOD AND DEVICE FOR FOLLOWING AN OBJECT IN A SEQUENCE OF AT LEAST TWO IMAGES

(71) Applicants: Benoit Thouy, Issy les Moulineaux (FR); Jean-François Boulanger, Issy les Moulineaux (FR)

(72) Inventors: Benoit Thouy, Issy les Moulineaux (FR); Jean-François Boulanger, Issy les Moulineaux (FR)

(73) Assignee: Morpho (FR)

( * ) Notice: Subject to any disclaimer, the term of this patent is extended or adjusted under 35 U.S.C. 154(b) by 0 days.

(21) Appl. No.: 14/361,651

(22) PCT Filed: Nov. 28, 2012

(86) PCT No.: PCT/EP2012/073775
§ 371 (c)(1),
(2) Date: May 29, 2014

(87) PCT Pub. No.: WO2013/079497
PCT Pub. Date: Jun. 6, 2013

(65) Prior Publication Data
US 2014/0355832 A1    Dec. 4, 2014

(30) Foreign Application Priority Data

Dec. 2, 2011 (FR) .................................... 11 61075

(51) Int. Cl.
*G06K 9/00* (2006.01)
*G06K 9/62* (2006.01)
(Continued)

(52) U.S. Cl.
CPC .............. *G06K 9/6212* (2013.01); *G06K 9/623* (2013.01); *G06T 7/2033* (2013.01); *G06K 9/00335* (2013.01); *G06K 9/46* (2013.01); *G06K 2009/6213* (2013.01)

(58) Field of Classification Search
CPC ... G06K 9/00335; G06K 9/46; G06K 9/6212; G06K 9/623; G06K 2009/6213; G06T 7/2033
USPC ......................................................... 382/103
See application file for complete search history.

(56) References Cited

U.S. PATENT DOCUMENTS 7,519,200 B2 *  4/2009  Gokturk et al. ................ 382/118
7,577,654 B2 *  8/2009  Brants et al. .......................... 1/1
(Continued)

OTHER PUBLICATIONS

Nan et al., "A BoF Model Based CBCD System Using Hierarchical Indexing and Feature Similarity Constraints", ICIMCS '10 Proceedings of the Second International Conference on Internet Multimedia Computing and Service, 179-184.*
(Continued)

*Primary Examiner* — Katrina Fujita
(74) *Attorney, Agent, or Firm* — Thorpe North & Western

(57) ABSTRACT

A method for following an object in a sequence of at least two images, termed previous and current, comprises a step of forming a first set $E_p$ of points $E_p = \{P_p(1), \ldots, P_p(i), \ldots, P_p(N)\}$ by extracting N characteristic points $P_p(i)$ of the object present in the previous image and of forming a second set $E_c$ of points $E_c = \{P_c(1), \ldots, P_c(i), \ldots, P_c(M)\}$ by extracting M characteristic points $P_c(j)$ of the object present in the current image. The method further comprises a step of estimating the parameters of a model of movement of the object between the two images on the basis of pairs of matched points thus formed, and a step of selecting the pairs of matched points used to estimate the parameters of the movement model. The pairs of matched points may be selected solely from among those which are related to points of the first set of points which are singular.

16 Claims, 4 Drawing Sheets

(51) Int. Cl.
*G06T 7/20* (2006.01)
*G06K 9/46* (2006.01)

(56) References Cited

U.S. PATENT DOCUMENTS

| | | | | |
|---|---|---|---|---|
| 7,761,466 | B1* | 7/2010 | Eshghi | 707/772 |
| 7,783,135 | B2* | 8/2010 | Gokturk et al. | 382/305 |
| 7,787,711 | B2* | 8/2010 | Agam et al. | 382/305 |
| 7,809,192 | B2* | 10/2010 | Gokturk et al. | 382/176 |
| 7,809,722 | B2* | 10/2010 | Gokturk et al. | 707/736 |
| 7,949,186 | B2* | 5/2011 | Grauman et al. | 382/170 |
| 8,015,132 | B2* | 9/2011 | Xu | 706/20 |
| 8,031,914 | B2* | 10/2011 | Zhang | 382/118 |
| 8,050,454 | B2* | 11/2011 | Yi et al. | 382/103 |
| 8,108,332 | B2* | 1/2012 | Misra et al. | 706/52 |
| 8,224,029 | B2* | 7/2012 | Saptharishi et al. | 382/103 |
| 8,315,463 | B2* | 11/2012 | Gallagher et al. | 382/190 |
| 8,332,419 | B1* | 12/2012 | Dhua et al. | 707/758 |
| 8,411,141 | B2* | 4/2013 | Hirai et al. | 348/143 |
| 8,526,679 | B2* | 9/2013 | Saruta et al. | 382/106 |
| 8,533,162 | B2* | 9/2013 | Klinkigt et al. | 707/669 |
| 8,538,141 | B2* | 9/2013 | Sakimura et al. | 382/159 |
| 8,553,981 | B2* | 10/2013 | Mei et al. | 382/173 |
| 8,582,887 | B2* | 11/2013 | Suzuki et al. | 382/181 |
| 8,660,316 | B2* | 2/2014 | Mays et al. | 382/113 |
| 8,780,110 | B2* | 7/2014 | Ben Himane et al. | 345/419 |
| 8,781,162 | B2* | 7/2014 | Zhu et al. | 382/103 |
| 8,868,571 | B1* | 10/2014 | Bissacco et al. | 707/751 |

OTHER PUBLICATIONS

Qin et al., "Hello neighbor: accurate object retrieval with k-reciprocal nearest neighbors", CVPR 2011, Jun. 2011, 777-784.*
Xia et al., "3D Object Recognition Using Hyper-Graphs and Ranked Local Invariant Features", SSPR&SPR 2008, LNCS 5342, 117-126.*
Tian et al., "Building descriptive and discriminative visual codebook for large-scale image applications", 2010, Multimed Tools Appl (2011) 51, 441-477.*
Avrithis et al., "Retrieving Landmark and Non-Landmark Images from Community Photo Collections", 2010, Proceedings of the international conference on Multimedia, 153-162.*
Can et al., "Searching for Repeated Video Sequences", 2007, Proceedings of the international workshop on Workshop on multimedia information retrieval, 207-216.*
Grauman et al., "Efficient Image Matching with Distributions of Local Invariant Features", CVPR 2005, vol. 2, 627-634.*
Huang et al., "A Dissimilarity Kernel With Local Features for Robust Facial Recognition", Proceedings of 2010 IEEE 17th International Conference on Image Processing, 3785-3788.*
International Search Report, dated Jul. 1, 2013, 4 pages, Netherlands.
Perez P et al, "Robust and Accurate Registration of Images with Unknown Relative Orientation and Exposure", IEEE Conference on Image Processing, 2005. ICIP 2005., Sep. 11, 2005, 4 pages, Piscataway, New Jersey, US.
Bing Li et al, "Rank-SIFT: Learning to rank repeatable local interest points", 2011 IEEE Conference on Computer Vision and Pattern Recognition, Jun. 20, 2011, 8 pages, Providence, Rhode Island, US.
Shenping Xia et al: "Ranking the local invariant features for robust visual saliencies", 19th International Conference on Pattern Recognition, 2008. ICPR 2008., Dec. 8-11, 2008, 4 pages, Tampa, Florida, US.
Martin A. Fischler; Robert C. Bolles, Random Sample Consensus: A Paradigm for Model Fitting with Applications to Image Analysis and Automated Cartography, Jun. 1981, 15 pages, vol. 24, No. 6, Communications of the ACM, New York, New York, USA.
Davide Maltoni et al., Handbook of Fingerprint Recognition, 2003, 3 pages, Springer, New York, New York, USA.

* cited by examiner

METHOD AND DEVICE FOR FOLLOWING AN OBJECT IN A SEQUENCE OF AT LEAST TWO IMAGES

FIELD OF THE INVENTION

The present invention concerns a method for following an object in a sequence of at least two images.

BACKGROUND

In the field of image processing, one of the recurrent problems is determining the match for an object present in a so-called preceding image in the sequence of images, in a so-called current image in the sequence of images. This problem is encountered in many applications such as the reconstruction of three-dimensional images, the temporal interpolation of sequences of images based on the movement of the objects, the temporal segmentation of sequences of images or the following of an object.

SUMMARY

For following an object, this problem is solved by matching an object present in the current image in the sequence of images from knowledge of the position of this object in the preceding image in this sequence of images.

One of the methods used is the so-called optical stream method. Calculating an optical stream consists of extracting a global dense velocity field from the sequence of images by assuming that the intensity (or the colour) is preserved during the movement of the object. For example, Quénot (The "Orthogonal Algorithm" for Optical Flow Detection using Dynamic Programming, IEEE International Conference on Acoustics, Speech and Signal Processing, San Francisco, Calif., USA, March 1992) presents an example of optical stream calculation based on the search for successive approximations of a field of movements between two images that minimises a distance between these images while respecting certain constraints of continuity and regularity.

Optical stream calculation methods are global methods that are suitable when the amplitude of the movement of the object between the two images is small or when information on the context of following of this movement is known a priori. On the other hand, this method is not suitable when the amplitude of the movement is not known a priori. This is the case in particular in the case of applications checking the validity of a lottery ticket. This is because, in this type of application, a lottery ticket is placed on a table and a camera acquires a sequence of images of this table. As the lottery ticket is placed by an operator on the table and then generally arranged by this operator so as to be approximately at the centre of this table, the movement of the ticket object present in two successive images has an amplitude that is such that this movement cannot be correctly approximated by calculating the optical stream.

In this type of situation, it is preferable to use a local method known as matching of points. The principle consists of forming a first set of characteristic points and respectively a second set by extracting characteristic points on the object present in the previous and respectively current image. A local descriptor is then calculated for each of the characteristic points extracted. To this end, use is made for example of a SIFT (Scale-Invariant Feature Transform) descriptor or a SURF (Speed Up Robust Features) descriptor. Next the similarity between the descriptor of each point on the previous image and the descriptor of each point on the current image is calculated, and pairs of matched points are formed by seeking to associate a point on the current image with each point on the previous image so as to maximise a criterion, normally global, based on the matchings of points in question, subject to the constraint of not using the same point on one or other of the sets in two different matchings. Each pair of matched points then makes it possible to define a movement vector, and analysing all these movement vectors makes it possible to estimate a global model of movement of the object between the two images. This movement model is then generally used for detecting an object in the current image by comparing the prediction of the location of this object in the current image with an object present in this current image.

When the object has a repetition of the same pattern over the majority of its surface, such as for example a lottery ticket grid, a large number of points on the current image have the same similarity with respect to the same point on the previous image. The result is an ambiguity in matching of points since each point on the previous image may be matched indifferently with several points on the current image, and choosing one of these points randomly may lead to an erroneous estimation of the global movement of the object.

To remove such ambiguities, using a point matching method such as for example the majority vote method on the generalised Hough transform or the RANSAC (RANdom SAmple Consensus) method is then known from the prior art.

In general terms, majority vote on the Hough transform is a deterministic method that makes it possible to estimate the parameters of a parametric model representing a set of observed data. The principle consists of filling in an accumulator table discretising the parameterising space of the model. For each minimum combination of data, a model is calculated and the box of the table corresponding to the model is incremented according to the discretisation of the table. After having repeated the process on all the minimum combinations of data possible, the maximum of the table gives the correct set of parameters (to within quantification).

This type of transform was used in the case of matching fingerprints (Handbook of Fingerprint Recognition, Davide Maltoni et al, pp. 184-186, 2003).

Applied to the determination of the movement of an object between two images, the input data of the generalised Hough transform are all the pairs of matched points and the model is a parametric model of movement of an object (rotation/translation or homography).

In general terms, the RANSAC method is an iterative method that makes it possible to estimate the parameters of a parametric model from a set of observed data that contains aberrant values (outliers). It is a non-deterministic method in the sense that it makes it possible to estimate the correct model with a certain probability only, the latter increasing with a greater number of iterations. The method was published for the first time by Fischler and Bolles in 1981 (Martin A. Fischler and Robert C. Bolles, "Random Sample Consensus: A Paradigm for Model Fitting with Applications to Image Analysis and Automated Cartography", in *Comm. of the ACM*, vol. 24, June 1981, p. 381-395). The basic assumption of this method is that the data consist of inliers, namely data the distribution of which can be explained by a set of parameters of the model, and outliers that are therefore data that do not correspond to this chosen set of parameters. The aberrant values may come for example from the extreme values of a noise, erroneous measurements or false assumptions as to the interpretation of the data.

Applied to the determination of the movement of an object between two images, the input data of the RANSAC method are a set of pairs of matched points, each pair comprising a point on the current image matched with a point on the previous image, and a parametric movement model is rotation, translation or homography.

The RANSAC method then consists of randomly selecting pairs of matched points, referred to as candidate inliers, which do not have any conflict between them, that is to say which do not have in common the same point on the previous image or the same point on the current image. The number of candidate inliers depends on the complexity of the model, fundamentally on the number of equations necessary for calculating all the parameters of the model. For example, the number of inliers is equal to two for translation/rotation and to four for a homography.

The set of pairs of matched points thus selected is then tested in the following manner:
- the parameters of the movement model are adjusted to the candidate inliers, that is to say all the free parameters of the model are estimated from this set of pairs of matched points;
- all the other pairs of possible matched points are next tested on the model thus estimated. If a pair of matched points does indeed correspond to the estimated model then it is considered to be an inlier of the model;
- the estimated model is next considered to be correct if sufficient pairs have been classified as inliers of the model;
- optionally, the model is re-estimated from all its inliers;
- finally, the model is evaluated by its number of inliers and optionally by the mean error between the coordinates of the points on the current image of the inlier pairs of the model and the coordinates calculated by applying the model to the points on the previous image of the inlier pairs of the model.

This procedure is repeated a predetermined number of times, each time producing either a model that is rejected since too few points are classified as inliers, or a readjusted model and a corresponding error measurement. In the latter case, the re-evaluated model is kept if its error is smaller than that of the previous model.

These methods of matching points by majority vote are not suitable when the object has large areas on which the same pattern is repeated, such as grids of a lottery ticket, since, as each point on the previous image may be indifferently associated with a large number of candidate points on the current image, these methods of estimating parameters of the model have difficulty in distinguishing the actual movement model among all the possible models.

The problem solved by the present invention is remedying the aforementioned drawbacks.

To this end, the present invention concerns a method for following an object in a sequence of at least two so-called previous and current images, said method comprising the following steps:
- forming a first set of points, and respectively a second set, by extracting characteristic points of this object in the previous and respectively current images,
- calculating a local descriptor for each of the characteristic points extracted,
- quantifying the dissimilarity between the descriptor of each point in the first set of points and the descriptor of each point in the second set of points,
- forming pairs of matched points for each point in the first set of points according to the dissimilarities between descriptors thus quantified, each pair of matched points associating a point in the first set of points with a point in the second set of points,
- estimating the parameters of a model of movement of the object between the two images from pairs of matched points thus formed.

The method is characterised, according to the present invention, in that the step of estimating the parameters of the movement model is preceded by a step of selecting the pairs of matched points used to estimate the parameters of the movement model, during which said pairs of matched points are solely selected from those that relate to points in the first set of points that are singular, each point in the first set of points being a singular point,
- firstly, if the smallest dissimilarity between the descriptor of this point in the first set of points and the descriptor of a point in the second set of points is less than a predetermined threshold, and
- the points in the second set of points that relate to this point in the first set of points being ordered by increasing dissimilarity in order to form a list of ordered points, if, secondly, there exists an index $K_i$ of this list such that the dissimilarity is less than a predetermined value and this index $K_i$ such that the difference between the dissimilarity between the point in the first set of points and the point in the second set points that relates to this index $K_i$, and the dissimilarity between the point in the first set of points and the point in the second set of points that relates to the index that follows the index $K_i$, is above a predetermined threshold.

The selection step makes it possible to keep only the points on the previous image that have a good similarity with at least one point on the current image and to keep only the matchings between each of these points on the previous image with the points on the current image that are the most similar to them in the sense of the descriptors. This step also makes it possible to reject the points that may be indifferently matched with a large number of points. Thus this selection of pairs of matched points makes it possible to keep only the pairs of the most significant matched points, which makes it possible to reduce the matching areas and therefore to increase the robustness of the estimation of the model of movement of an object on which the same pattern is repeated.

The invention also concerns a device comprising means for implementing the method, a computer program, which can be stored on a medium and/or downloaded from a communication network, in order to be read by a computer system or a processor. This computer program comprises instructions for implementing the method mentioned above, when said program is executed by the computer system or the processor. The invention also concerns storage means comprising such a computer program.

The features of the invention mentioned above, as well as others, will emerge more clearly from a reading of the following description of an example embodiment, said description being given in relation to the accompanying drawings, among which:

DETAILED DESCRIPTION

Figure 1:
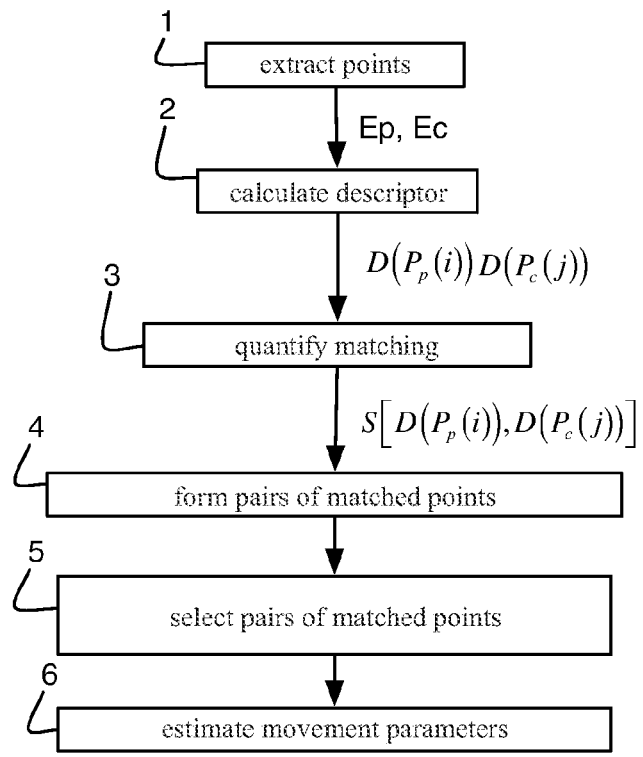
FIG. 1 shows a diagram of the steps of the object following method according to the present invention.
Figure 2:
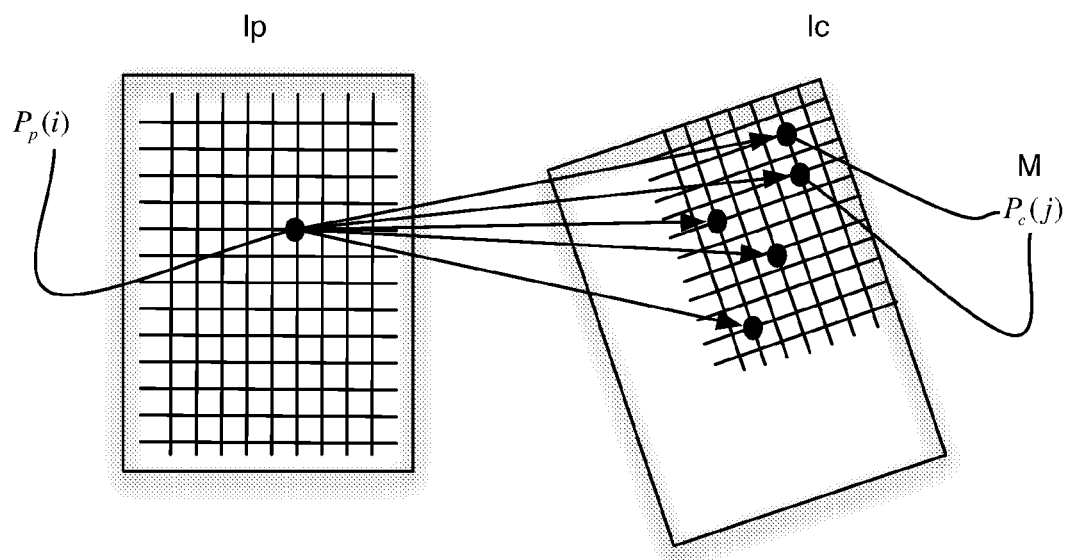
FIGS. 2 and 3 illustrate steps of the object following method.

In general terms, the method for following an object in a sequence of at least two images referred to as previous $I_p$ and current $I_c$ as illustrated in FIG. 1, comprises a step 1 for forming a first set $E_p$ of points $E_p = \{P_p(1), \ldots, P_p(i), \ldots, P_p(N)\}$ by extracting N characteristic points $P_p(i)$ on the object present in the image $I_p$ and for forming a second set $E_c$ of points $E_c = \{P_c(1), \ldots, P_c(i), \ldots, P_c(M)\}$ by extracting M characteristic points $P_c(j)$ on the object present in the image $I_c$ as illustrated in FIG. 2, where N is here equal to 1 and M is equal to 5. These integer values N and M are given here only by way of example and could not limit the scope of the method.

The characteristic points are extracted by a method known from the prior art such as for example a Harris detector or a Moravec detector. However, the method is in no way limited to the use of these detectors but can be applied whatever the method for extracting characteristic points used.

The method also comprises a step 2 for calculating a local descriptor $D(P_p(i))$ for each of the N characteristic points extracted and a descriptor $D(P_c(j))$ for each of the M characteristic points extracted. The descriptors are for example SIFT (Scale Invariant Feature Transform) or SURF (Speed Up Robust Features) descriptors. However, the method is in no way limited to these descriptors but can be applied whatever the method used for describing the visual characteristics of a vicinity of a characteristic point.

The method also comprises a step 3 for quantifying the dissimilarity between the descriptor $D(P_p(i))$ of each point $P_p(i)$ on the image $I_p$ and the descriptor $D(P_c(j))$ of each point $P_c(j)$ on the image $I_c$. For example, a dissimilarity function $DIS[D(P_p(i)), D(P_c(j))]$ is defined by $1 - SIM[D(P_p(i)), D(P_c(j))]$ with $SIM[D(P_p(i)), D(P_c(j))]$ a similarity function defined between descriptors for example by the norm $L_1$ or $L_2$ in the space of the descriptors, and standardised to 1. Other known methods of the prior art can be used without departing from the scope of the present invention. In addition, hereinafter, the methods are described using the dissimilarity $DIS[D(P_p(i)), D(P_c(j))]$ between descriptors. However, methods that use the similarity between descriptors instead of dissimilarity do not depart from the scope of the present invention.

The method also comprises a step 4 for forming M pairs of matched points for each point $P_p(i)$ according to the dissimilarities between descriptors thus quantified, each pair $C(i, j)$ of matched points associating a point $P_p(i)$ with a point $P_c(j)$. For example, these M pairs $C(i, j)$ of points matched with the point $P_p(i)$ correspond to the points of the second set that have the smallest dissimilarities with respect to this point $P_p(i)$.

The method comprises a step (5) of selecting pairs of matched points and a step 6 of estimating parameters of a model of movement of the object between the previous and current images from the set of pairs of matched points thus selected rather than the M×N pairs of matched points as is the case in the prior art.

During step 5, the pairs of matched points that are used for estimating the parameters of the movement model are solely selected from those that relate to points in the first set of points that are singular.

Each point $P_p(i)$ in the first set of points is a singular point:
firstly, if the smallest dissimilarity between the descriptor of this point $P_p(i)$ and the descriptor of a point $P_c(j)$ in the second set of points is below a predetermined threshold TH1, and the points $P_c(j)$ that relate to this point $P_p(i)$ being ordered by increasing dissimilarity in order to form a list $P_c^i$ of ordered points, if, secondly, there exists an index $K_i$ in this list such that the dissimilarity $DIS[D(P_p(i)), D(P_c(j))]$ is less than a predetermined value TH2 and this index $K_i$ is such that the difference between the dissimilarity between the point $P_p(i)$ and the point $P_c^i(K_i)$ that relates to this index $K_i$, and the dissimilarity between the point in the first set of points and the point $P_c(K_i+1)$ in the second set that relates to the index that follows the index $K_i$, is above a predetermined threshold TH3.

Figure 3:
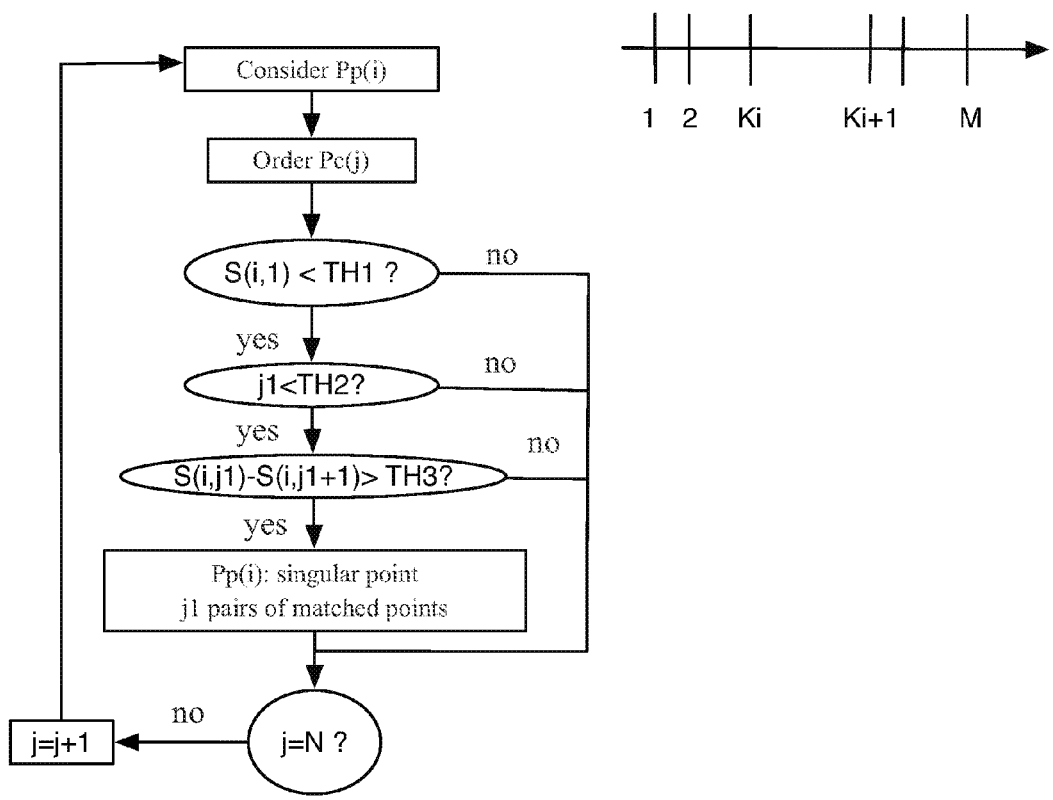

According to an embodiment of step 5 illustrated in FIG. 3, for each point $P_p(i)$ the points $P_c(j)$ issuing from the M pairs $C(i, j)$ associated with this point $P_p(i)$ are ordered according to their increasing dissimilarity between their descriptor and that of the point $P_p(i)$ forming the list $P_c^i$. The point $P_c^i(1)$ is then the point the dissimilarity of which is the lowest, that is to say the point $P_c^i(1)$ is that of the points $P_c(j)$ that most resembles the point $P_p(i)$ in terms of descriptors and the point $P_c^i(M)$ is that of the points $P_c(j)$ that least resembles the point $P_p(i)$.

Thus the first condition for the point $P_p(i)$ to be a singular point is that the dissimilarity $DIS[D(P_p(i)), D(P_c^i(1))]$ between the point $P_c^i(1)$ and the point $P_p(i)$ is below the threshold TH1.

The second condition that must be satisfied is as follows. The dissimilarity $DIS[D(P_p(i)), D(P_c^i(K_i))]$ must firstly be below the threshold TH2. The difference between the dissimilarity $DIS[D(P_p(i)), D(P_c^i(K_i))]$ between the descriptor of the point $P_p(i)$ and the descriptor of the point $P_c^i(K_i)$ and the dissimilarity $DIS[D(P_p(i)), D(P_c^i(K_i+1))]$ between the descriptor of the point $P_p(i)$ and the descriptor of the point $P_c^i(K_i+1)$ (which follows the point $P_c^i(K_i)$ in increasing order of dissimilarity) is calculated. The second condition is satisfied if, secondly, this difference in dissimilarity is above the threshold TH3.

The value $K_i$ is not fixed a priori, and is particular to each point $P_p(i)$ and $K_i$ can therefore change for each point $P_p(i)$. The value of $K_i$ is initially equal to 1 and, if the difference between the dissimilarity $DIS[D(P_p(i)), D(P_c^i(1))]$ and $DIS[D(P_p(i)), D(P_c^i(2))]$ is less than TH3, the index $K_i$ is incremented by 1. If the difference between the dissimilarity $DIS[D(P_p(i)), D(P_c^i(2))]$ and $DIS[D(P_p(i)), D(P_c^i(3))]$ is also less than TH3, the index $K_i$ is once again incremented by 1 and so on until the difference between the dissimilarity $DIS[D(P_p(i)), D(P_c^i(K_i))]$ and $DIS[D(P_p(i)), D(P_c^i(K_i+1))]$ is greater than TH3 and as long as the dissimilarity $DIS[D(P_p(i)), D(P_c^i(K_i))]$ remains less than TH2.

If one of the above conditions is not satisfied, the point $P_p(i)$ is not considered to be a singular point and $K_i=0$.

According to an embodiment of steps 5 and 6, $K_i$ pairs of matched points are selected from the pairs of matched points relating to each singular point $P_p(i)$, said $K_i$ pairs of matched points being those that have the lowest dissimilarities. According to the example in FIG. 3, only the first three pairs of matched points are selected ($K_i=3$). The parameters of the model of movement of the object are then estimated by majority vote from the $$K = \sum_{i=0}^{N} K_i$$

pairs of matched points thus selected rather than the M×N pairs of matched points as is the case in the prior art.

Figure 4:
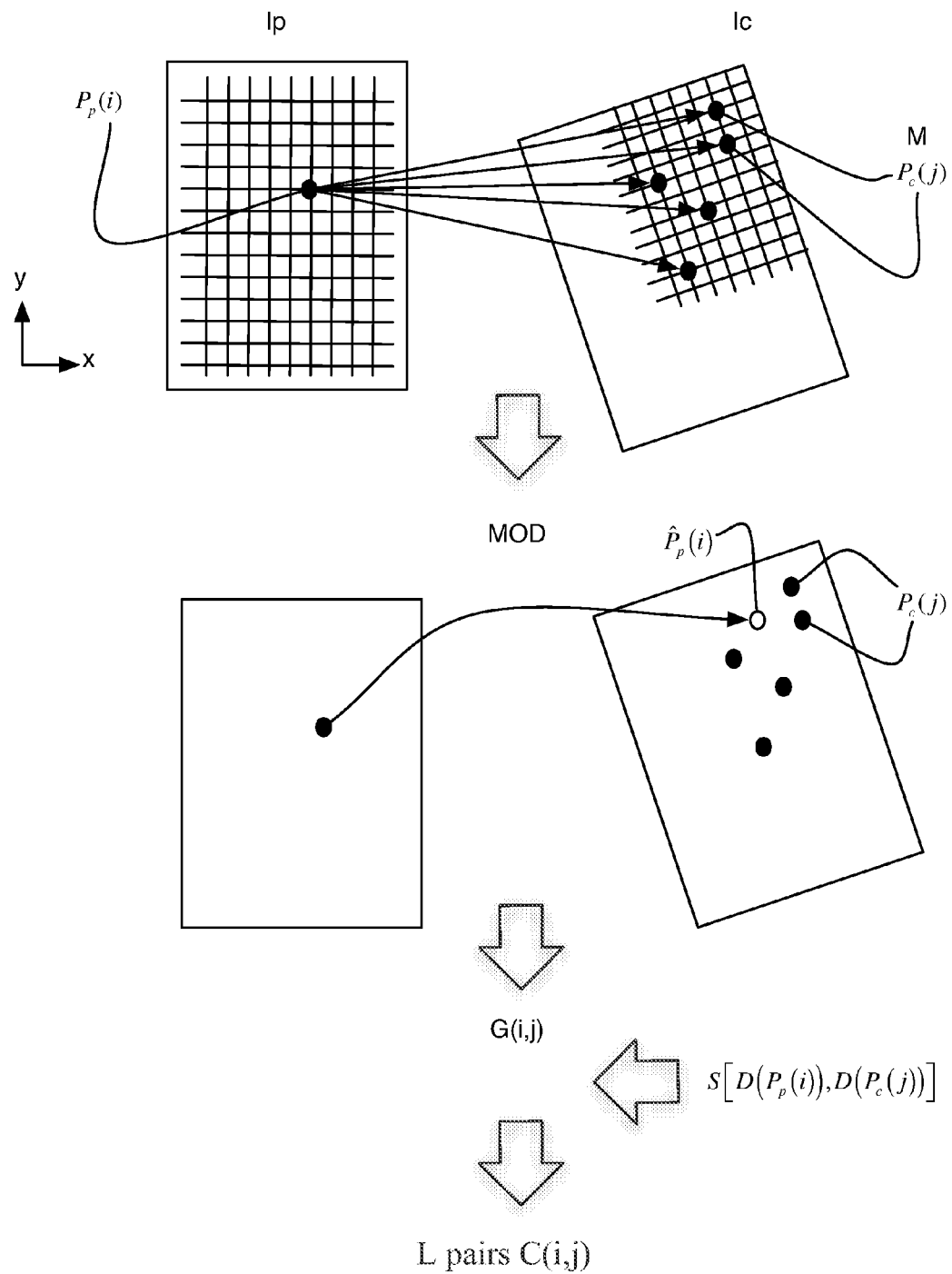
FIG. 4 illustrates an embodiment of the object following method.

According to a variant of this embodiment illustrated in FIG. 4, a geometric cost $G(i, j)$ is associated with each of the $K_i$ pairs $C(i, j)$ of matched points $(P_p(j), P_c(j))$. This geometric cost $G(i, j)$ is a function of the error between the estimation $\hat{P}_p(i)$ of the location of the point $P_p(i)$ in the image Ic according to the movement model thus estimated and the location of the point $P_c(j)$. $L_i$ of the $K_i$ pairs of matched points $C(i, j)$ are then considered per point $P_p(i)$. $L_i$ is an integer value. Said $L_i$ pairs of matched points correspond to the points $P_c(j)$ that minimise a function combining firstly their dissimilarities to the point $P_p(i)$ and secondly their geometric costs $G(i, j)$. For example, this function is given by $DIS[D(P_p(j)), D(P_c(i))] + \alpha \cdot G(i, j)$ with $\alpha$ a weighting factor fixed a priori and the geometric cost $G(i, j)$ is the Euclidian distance between the estimate $\hat{P}_p(i)$ of the location of the point $P_p(i)$ and the location of the point $P_c(j)$ that is matched with it.

In other words, the $L_i$ points are the points that are the most similar to the point $P_p(i)$ considered and the predictions of which in the current image are most geographically close to this point.

The parameters of the model of movement of the object are then estimated by majority vote from the $$L = \sum_{j=0}^{N} L_i$$

pairs of matched points thus selected.

This embodiment is advantageous since taking into account a geometric constraint for selecting the candidate points of the current image in order to be matched with a point on the previous image makes it possible to avoid abberations in matching that occur when two matched points are in fact points on the object the matching of which does not comply with the geometry of the object.

According to one embodiment, the movement of the object is modelled by a translation and/or a rotation defined in a plane (x,y) and the parameters of this model are estimated from the set either of the K or of the L pairs of matched points selected $C(i, j)$.

According to a preferred embodiment, the movement of the object is modelled by a homography and the parameters of this model are estimated from all the L pairs of matched points selected $C(i, j)$.

The estimation of the movement by homography then makes it possible to have a model of the movement of the object that is very precise and the estimation of the location of the object in the current image is then very close to the object actually present in this image, even if the amplitude of the movement of this object between the two images is great. The reliability of detection of the object in the current image is then increased thereby.

According to a preferred embodiment, the estimation of the parameters of a model of movement of the object is done by a RANSAC method taking as an input either the K or the L pairs of matched points thus selected for each point $P_p(i)$. The details of this RANSAC method are found in the article "Deterministic Sample Consensus with Multiple Match Hypotheses", MacIlroy, Rosten, Taylor and Drummond, BMVC 2010.

According to one embodiment, the estimation of the parameters of the movement model is done by a Hough transform taking as its input either the K or the L pairs of matched points thus selected for each point $P_p(i)$.

By way of example, the estimation of the parameters of the movement model, here a translation/rotation, is done in the following manner by majority vote on the Hough transform. For each pair of matched points $(P_p(i_1), P_c(j_1))$ among the K or L pairs selected (step 5) and for each pair of matched points $(P_p(i_2), P_c(j_2))$ among the K or L selected pairs (step 5) chosen such that $i_1 \neq i_2$, $j_1 \neq j_2$, the equations for calculating a translation-rotation are written:

$$x_{i2} = S \cdot \cos\theta \cdot x_{i1} - S \cdot \sin\theta \cdot y_{i1} + T_x$$

$$y_{i2} = S \cdot \sin\theta \cdot x_{i1} + S \cdot \cos\theta \cdot y_{i1} + T_y$$

$$x_{j2} = S \cdot \cos\theta \cdot x_{j1} - S \cdot \sin\theta \cdot y_{j1} + T_x$$

$$y_{j2} = S \cdot \sin\theta \cdot x_{j1} + S \cdot \cos\theta \cdot y_{j1} + T_y$$

The scale parameter S is ignored here.

The parameters $\theta$, $T_x$ and $T_y$ of the transformation are therefore calculated from this system of equations and are then discretised in accordance with the discretisation of a vote cube. The vote cube is here a three-dimensional table, with $Q_x$ bins discretising the translation $T_x$ in an interval $[T_x^{min}, T_x^{max}]$, $Q_y$ bins discretising the translation $T_y$ in an interval $[T_y^{min}, T_y^{max}]$ and $Q_\theta$ bins discretising the angle of rotation $\theta$ in a interval $[T_\theta^{min}, T_\theta^{max}]$. The box of the vote cube of coordinates $$\left( \left\lfloor \frac{T_x - T_x^{min}}{T_x^{max} - T_x^{min}} \cdot Q_x \right\rfloor, \left\lfloor \frac{T_y - T_y^{min}}{T_y^{max} - T_y^{min}} \cdot Q_y \right\rfloor, \left\lfloor \frac{T_\theta - T_\theta^{min}}{T_\theta^{max} - T_\theta^{min}} \cdot Q_\theta \right\rfloor \right),$$

where $\lfloor x \rfloor$ is the integer part of the x, is then incremented. A smoothing of the vote cube by a size 3 filter is preferably performed in order to minimise the imprecisions of the models calculated. The translation-rotation chosen is then that which corresponds to the box of the vote cube that contains the highest value.

Figure 5:
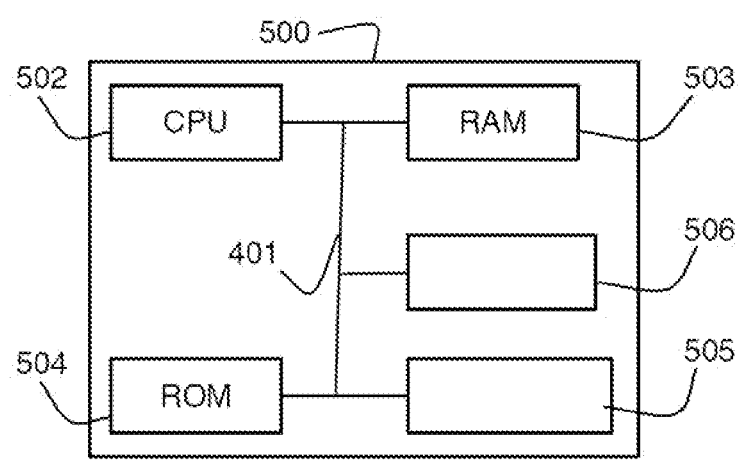
FIG. 5 illustrates schematically the architecture of a device provided for implementing the matching method.

FIG. 5 shows schematically an architecture of a device provided for implementing the method.

The device 500 comprises, connected by a communication bus 501:
  a processor, microprocessor, microcontroller (denoted μc) or CPU (Central Processing Unit) 502;
  a random access memory RAM 503;
  a read only memory ROM 504;
  a storage-medium reader 505, such as an SD card (Secure Digital Card) reader; and
  means 506 for interfacing with a communication network, such as for example a cellular telephony network.

The microcontroller 502 is capable of executing instructions loaded in the RAM 503 from the ROM 504, from an external memory (not shown), from a storage medium such as an SD card or the like, or from a communication network. When the device 500 is powered up, the microcontroller 502 is capable of reading instructions from the RAM 503 and executing them. These instructions form a computer program that causes the implementation, by the microcontroller 502, of all or some of the methods described above in relation to FIG. 1.

All or some of the methods described above in relation to FIG. 1 may be implemented in software form by the execution of a set of instructions by a programmable machine, such as a DSP (Digital Signal Processor) or a microcontroller, such as the microcontroller 502, or be implemented in hardware form by a machine or a dedicated component, such as an FPGA (Field-Programmable Gate Array) or an ASIC (Application-Specific Integrated Circuit).

The invention claimed is:

1. A method for following an object in a sequence of at least two images, including previous and current images, said method comprising:

forming a first set of points ($E_p$), and respectively a second set ($E_c$), by extracting characteristic points of the object in the previous and current images, respectively, calculating a local descriptor for each of the characteristic points extracted, quantifying the dissimilarity between the descriptor of each point in the first set of points and the descriptor of each point in the second set of points, forming pairs of matched points (C(i, j)) for each point in the first set of points according to the dissimilarities between descriptors thus quantified, each pair of matched points associating a point in the first set of points with a point in the second set of points, estimating the parameters of a movement model of the object between the two images from pairs of matched points thus formed, wherein estimating the parameters of the movement model is preceded by selecting the pairs of matched points used to estimate the parameters of the movement model, during which said pairs of matched points are solely selected from those that relate to points in the first set of points that are singular, each point in the first set of points being a singular point, when a smallest dissimilarity between the descriptor of a point in the first set of points and the descriptor of a point in the second set of points is less than a predetermined threshold (TH1), the points in the second set of points that relate to the point in the first set of points being ordered by increasing dissimilarity in order to form a list ($P_c^i$) of ordered points, and there exists an index $K_i$ of the list such that the dissimilarity (DIS[$D(p_p(i)),D(P_c^i(j))$]) is less than a predetermined value (TH2) and the index $K_i$ is such that the difference between the dissimilarity between the point ($P_p(i)$) in the first set of points and the point ($P_c^i K_i$)) in the second set points that relates to the index $K_i$, and the dissimilarity between the point in the first set of points and the point ($P_{c(Ki}+1$)) in the second set of points that relates to the index that follows the index $K_i$, is above a predetermined threshold (TH3).

2. The method according to claim 1, wherein the pairs of matched points selected by a singular point are those that have the smallest dissimilarities with respect to the singular point, and the estimation is based on a set of K pairs of matched points that contain the pairs of matched points thus selected for each singular point.

3. The method according to claim 2, wherein:

a geometric cost (G(i, j)) is associated with each of the $K_i$ pairs of matched points thus selected, the geometric cost being a function of an error between an estimation of the location of the point on the previous image in the current image and the location of the point that is matched with it in the current image, an integer number $L_i$ of the $K_i$ pairs of matched points are then selected per point of the previous image, said $L_i$ pairs of matched points corresponding to the points on the current image that minimise a function combining firstly their similarities with the point on the previous image and secondly their geometric costs, and the estimation is based on a set of L pairs of matched points that contain the pairs of matched points thus selected for each singular point.

4. The method according to claim 2, wherein the estimation of the parameters of a movement model of the object is performed using a random sample consensus method taking as input the K or the L pairs of matched points selected for each point on the previous image.

5. The method according to claim 2, wherein the estimation of the parameters of the movement model is performed by majority vote on a Hough transform taking as input the K or the L pairs of matched points selected for each point on the previous image.

6. The method according to claim 1, wherein:

a geometric cost (G(i, j)) is associated with each of the $K_i$ pairs of matched points thus selected, the geometric cost being a function of an error between an estimation of the location of the point on the previous image in the current image and the location of the point that is matched with it in the current image, an integer number $L_i$ of the $K_i$ pairs of matched points are then selected per point of the previous image, said $L_i$ pairs of matched points corresponding to the points on the current image that minimise a function combining firstly their similarities with the point on the previous image and secondly their geometric costs, and the estimation is based on a set of L pairs of matched points that contain the pairs of matched points thus selected for each singular point.

7. The method according to claim 6, wherein the movement of the object is modelled by homography and the parameters of the model are estimated from all the L pairs of matched points selected.

8. The method according to claim 7, wherein the estimation of the parameters of a movement model of the object is performed using a random sample consensus method taking as input the K or the L pairs of matched points selected for each point on the previous image.

9. The method according to claim 7, wherein the estimation of the parameters of the movement model is performed by majority vote on a Hough transform taking as input the K or the L pairs of matched points selected for each point on the previous image.

10. The method according to claim 6, wherein the movement of the object is modelled by homography and the parameters of the model are estimated from all the L pairs of matched points selected.

11. The method according to claim 6, wherein the estimation of the parameters of a movement model of the object is performed using a random sample consensus method taking as input the K or the L pairs of matched points selected for each point on the previous image.

12. The method according to claim 6, wherein the estimation of the parameters of the movement model is performed by majority vote on a Hough transform taking as input the K or the L pairs of matched points selected for each point on the previous image.

13. The method according to claim 1, wherein the estimation of the parameters of a movement model of the object is performed using a random sample consensus method taking as input the K or the L pairs of matched points selected for each point on the previous image.

14. The method according to claim 1, wherein the estimation of the parameters of the movement model is performed by majority vote on a Hough transform taking as input the K or the L pairs of matched points selected for each point on the previous image.

15. A non-transitory computer readable storage medium storing a computer program comprising instructions for the implementation, by a suitable device, of the method according to claim 1, when the computer program is executed by a processor of the device.

16. A device for following an object in a sequence of at least two images referred to as previous and current, said device comprising:
- a processor;
- a memory in electronic communication with the processor;
- instructions stored in the memory, the instructions being executable by the processor to:
  - form a first set of points ($E_p$), and respectively a second set ($E_c$), by extracting characteristic points of the object in the previous and current images, respectively,
  - calculate a local descriptor for each of the characteristic points extracted,
  - quantify the dissimilarity between the descriptor of each point in the first set of points and the descriptor of each point in the second set of points,
  - form pairs of matched points ($C(i, j)$) for each point in the first set of points according to the dissimilarities between descriptors thus quantified, each pair of matched points associating a point in the first set of points with a point in the second set of points,
  - estimate the parameters of a movement model of the object between the two images from pairs of matched points thus formed, and
  - select the pairs of matched points used for estimating the parameters of the movement model, the means for selecting the pairs of matched points being configured so that said pairs of matched points are only selected from those that relate to points in the first set of points that are singular, each point in the first set of points being a singular point, when
  - a smallest dissimilarity between the descriptor of a point in the first set of points and the descriptor of a point in the second set of points is less than a predetermined threshold (TH1), the points in the second set of points that relate to the point in the first set of points being ordered by increasing dissimilarity in order to form a list ($P_c^i$) of ordered points, and
  - there exists an index $K_i$ of the list such that the dissimilarity ($DIS\lfloor D(P_p(i)), D(P_c(j)) \rfloor$) is less than a predetermined value (TH2) and the index $K^i$, is such that the difference between the dissimilarity between the point ($P_p(i)$) in the first set of points and the point ($P_c^i(K_i)$) in the second set points that relates to the index $K_i$, and the dissimilarity between the point in the first set of points and the point ($P_c(K_i+1)$) in the second set of points that relates to the index that follows the index $K_i$, is above a predetermined threshold (TH3).

* * * * *